(12) United States Patent
Stern et al.

(10) Patent No.: US 7,472,130 B2
(45) Date of Patent: Dec. 30, 2008

(54) SELECT INDEXING IN MERGED INVERSE QUERY EVALUATIONS

(75) Inventors: Aaron A. Stern, Bellevue, WA (US);
Geary L. Eppley, Carnation, WA (US);
Umesh Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/244,670

(22) Filed: Oct. 5, 2005

(65) Prior Publication Data

US 2007/0078874 A1 Apr. 5, 2007

(51) Int. Cl.
*G06F 17/30* (2006.01)
(52) U.S. Cl. .............................. 707/101; 707/102; 707/1
(58) Field of Classification Search ................. 707/1–3, 707/101
See application file for complete search history.

(56) References Cited

U.S. PATENT DOCUMENTS

| | | | |
|---|---|---|---|
| 2002/0133484 A1 | 9/2002 | Chau et al. | 707/3 |
| 2003/0033285 A1 | 2/2003 | Jalali et al. | 707/1 |
| 2004/0010752 A1 | 1/2004 | Chan et al. | 715/513 |
| 2004/0103091 A1 | 5/2004 | Lindblad et al. | 707/3 |
| 2005/0055334 A1 | 3/2005 | Krishnamurthy | 707/2 |
| 2005/0097084 A1 | 5/2005 | Balmin et al. | 707/3 |
| 2005/0187906 A1 | 8/2005 | Madan et al. | 707/3 |
| 2005/0187947 A1* | 8/2005 | Wortendyke et al. | 707/100 |
| 2005/0228768 A1 | 10/2005 | Thusoo et al. | 707/1 |
| 2005/0228792 A1 | 10/2005 | Chandrasekaran et al. | 707/9 |
| 2006/0005122 A1 | 1/2006 | Lemoine | 715/513 |

FOREIGN PATENT DOCUMENTS

WO 2004/068270 12/2004

OTHER PUBLICATIONS

Yan et al, Index Structures for Selective Dissemination of Information Under the Boolean Model, 1994, ACM Transactions on Database Systems, citeseer.ist.psu.edu/article/yan94index.html.*
Altinel et al, Efficient Filtering of XML Documents for Selective Dissemination of Information, 2000, Proc. VLDB Conference,http://citeseer.ist.psu.edu/altinel00efficient.html.*

(Continued)

*Primary Examiner*—Yicun Wu
(74) *Attorney, Agent, or Firm*—Workman Nydegger (57) ABSTRACT

Embodiments provide for select indexing, which uses an array to simultaneously construct output sets for instructions that operate on input nodesets with common axes. During evaluation of a message against an instruction tree, when a branching node with a large "splay" is iterated over, rather than iterating over an input nodeset with a common axis once per branch, the select indexing described herein iterates over the nodeset once in total. More specifically, the select index data structure includes an array of empty node sets for instructions that both, branch from a branching node, and evaluate input nodes that share a common axis. Identifiers for the input nodeset are compared to indices within the select index, and matches for the input nodes are added to the corresponding nodeset for the appropriate instruction. The results of the evaluation may then be passed to the branches of the select instructions for further processing.

20 Claims, 4 Drawing Sheets

OTHER PUBLICATIONS

W3C, SOAP Version 1.2 Part 1: Messaging Framework, W3C Recommendation Jun. 24, 2003, http://www.w3.org/TR/2003/REC-soap12-part1-20030624/.*

Grama et al, A Survey of Parallel Search Algorithms for Discrete Optimization Problems, 1995, ORSA Journal of Computing, 7(4):365-385, http://citeseer.ist.psu.edu/et93survey.html.*

Krishnaprasad, et al., *Query Rewrite for XML in Oracle XML DB*, 2004 Oracle Corporation, 30th VLDB Conference, *available at* http://www.vldb.org/conf/2004/IND5P1.PDF, (PDF enclosed entitled "Article 1," 12 pages).

Liu, et al., "*An Evaluation of the Configurable Indexing and Ranking System for Retrieving Information from XML Documents*," UCLA Computer Science Department, *available at* http://www.cs.ucla.edu/~sliu/papers/TR040038.pdf (PDF enclosed entitled "Article 2," 19 pages).

Mahboob Alam Khalid, "*Implementation and Evaluation of a Path Indexing Framework for Large Collections of Interlinked XML Documents*," Saarland University, *available at* https://domino.mpi-sb.mpg.de/intranet/ag5/ag5publ.nsf/0/3634c105cc851603c1256ede003817e3/$FILE/khalid.pdf (PDF enclosed entitled "Article 3," 122 pages).

* cited by examiner

SELECT INDEXING IN MERGED INVERSE QUERY EVALUATIONS

CROSS-REFERENCE TO RELATED APPLICATIONS

N/A

BACKGROUND

Background and Relevant Art

Computing systems—i.e. devices capable of processing electronic data such as computers, telephones, Personal Digital Assistants (PDA), etc.—communicate with other computing systems by exchanging data messages according to a communications protocol that is recognizable by the systems. Such a system utilizes filter engines containing queries that are used to analyze messages that are sent and/or received by the system and to determine if and how the messages will be processed further.

A filter engine may also be called an "inverse query engine." Unlike a database, wherein an input query is tried against a collection of data records, an inverse query engine tries an input against a collection of queries. Each query includes one or more conditions, criteria, or rules that must be satisfied by an input for the query to evaluate to true against the input.

An XPath filter engine is a type of inverse query engine in which the filters are defined using the XPath language. The message bus filter engine matches filters against eXtensible Markup Language (XML) to evaluate which filters return true, and which return false. In one conventional implementation, the XML input may be a Simple Object Access Protocol (SOAP) envelope or other XML document received over a network.

A collection of queries usually takes the form of one or more filter tables that may contain hundreds or thousands of queries, and each query may contain several conditions. Significant system resources (e.g., setting up query contexts, allocating buffers, maintaining stacks, etc.) are required to process an input against each query in the filter table(s) and, therefore, processing an input against hundreds or thousands of queries can be quite expensive.

Queries included in a particular system may be somewhat similar since the queries are used within the system to handle data in a like manner. As a result, several queries may contain common portions or sub-expressions that typically had to be evaluated individually. Recently, however, developments have allowed identifying redundant portions of query expressions in an attempt to reduce the processing required to evaluate each expression against inputs for each message or XML document.

For example, some inverse query systems represent an expression as a hierarchical instruction tree, in which each node of the instruction tree represents an instruction, and in which each branch of an execution path in the instruction tree when executed from a root node to a terminating branch node represents a full query expression. As such, when an input message is received, the instruction tree is iterated over by executing instructions against the inputs or a message leading from the root node to a main or common branching node. Whenever the inverse query engine encounters a branching node, which represents a divergence from some of the redundant portions of query expressions, the inverse query engine may preserve the processing context or state for the sequential execution up to that branching node. The preserved processing context is then sequentially passed to each branch leading from the branching node such that when one branch is considered fully processed the next branch may then receive the processing context to evaluate its remaining expression path.

Although these systems allow for the processing of query expressions to occur more rapidly, there are still several drawbacks and shortcomings to such systems. For example, as mentioned above, when a query engine encounters a branching node, it evaluates the branches individually by sequentially handing state from the branching node to each extending branch. Assuming each extending branch operates on an input nodeset with the same axis, the input nodeset will be passed to each branch which will iterate over all the input nodes choosing the ones that fit the criteria thereof. Thus, this process takes the form of an O(mn) algorithm, wherein m equals the number of nodes in nodeset and n is the number of extending branches. When the number of branches or "splay" extending from the branching node is small, such evaluation may be acceptable. With a large splay, however, iterating over the nodeset once per branch can consume significant processing time and resources.

BRIEF SUMMARY

The above-identified deficiencies of current inverse query filter engines are overcome through example embodiments of the present invention. For example, embodiments described herein provide for efficiently evaluating select instruction of query expressions by simultaneously producing outputs thereof. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example embodiments provide for an inverse query filter engine sequentially executing instructions in an instruction tree leading from a root node to a branching node based on input(s) within a received message, wherein the branching node includes a query sub-paths extending there from. The branching node is then identified as a select index node in that some of the query sub-paths include select instruction nodes that operate on input nodes that share a common axis relative to the processing context for the sequential execution up to the branching node. Based upon identifying the branching node as a select index node, empty node sets are initialized within an associative array data structure for each of the select instruction nodes. The identifiers for each of the input nodes are compared to indices within the associative data structure for determining matches thereof. Based upon the comparison, at least one of the input nodes is added to the empty node set(s) within the associative data structure for simultaneously producing results of evaluating each of the select instruction nodes. Accordingly, the results are passed to branches extending from each of the plurality of query sub-paths for further evaluation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for evaluating nodes in parallel that diverge from a branch of an instruction tree for an inverse query engine. The embodiments of the present invention may comprise a special purpose or general-purpose computer including various computer hardware, as discussed in greater detail below.

Exemplary embodiments provide for select indexing, which uses an associative array or select index (or associative array, e.g., hash table) data structure, to simultaneously construct output sets for instructions that operate on input nodesets with common axes. More specifically, during evaluation of a message (e.g., an XML document) against an instruction tree, when a branching node with typically a large "splay" is iterated over, rather than iterating over an input nodeset with a common axis once per branch, the select indexing described herein iterates over the nodeset once in total.

More specifically, the select index data structure includes an array of empty node sets for instructions that both, branch from a branching node, and evaluate input nodes that share a common axis. Identifiers (e.g., namespace, local name, Qname, type, etc.) for the input nodeset of the common axis are then compared to indices within the select index for identifying those instructions interested in the input node. As matches are found, the input node is added to the corresponding nodeset for the appropriate instruction. The results of the evaluation, along with the processing context, are passed to the branches of the select instructions for further processing. Accordingly, embodiments described herein generate the exact same nodesets as a typical inverse query engine, except the select indexing creates the resultant output set simultaneously rather than in series.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Figure 1:
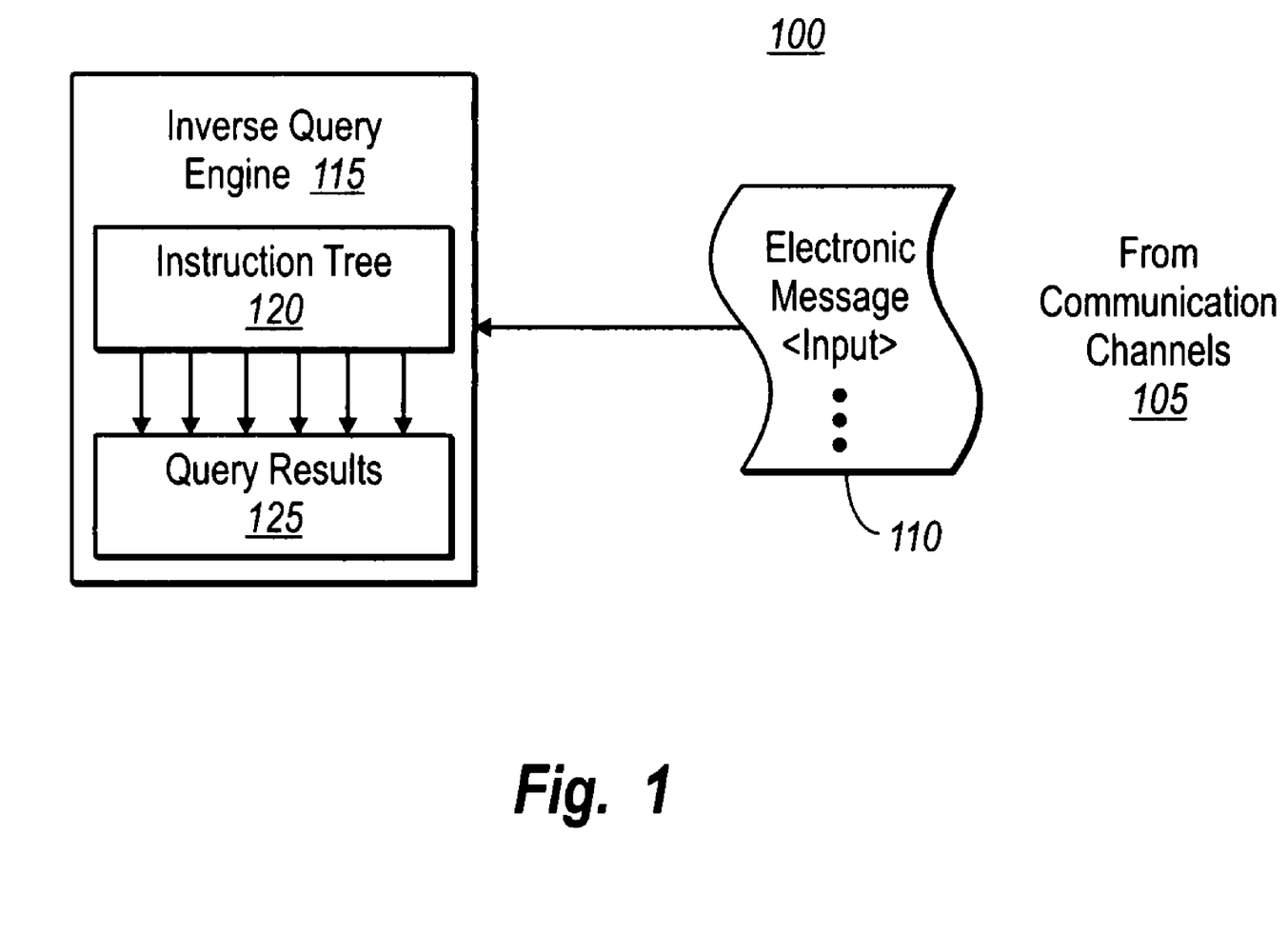
FIG. 1 illustrates an inverse query engine cooperatively interacting with an instruction tree to perform inverse querying against an input.

FIG. 1 illustrates an environment 100 in which an inverse query engine 115 cooperatively interacts with an instruction tree 120 to efficiently perform inverse querying against input from a message 110 to generate query results 125. In the illustrated example, an electronic message 110 with various inputs is evaluated using the inverse query engine 115. When executed, the electronic message 110 may be received over the communication channels 105. Alternatively, the electronic message 110 may be accessed from memory, storage, or received from any number of input components. In one embodiment, the electronic message is a hierarchically-structured document such as an eXtensible Markup Language (XML) document or a Simple Object Access Protocol (SOAP) envelope.

Although the instruction tree 120 is illustrated schematically as a box in FIG. 1, the instruction tree is actually a hierarchical tree that represents execution paths for a plurality of queries. Each node of the instruction tree represents an instruction, and each branch in the instruction tree when executed from a root node to terminating branch node represents a full query expression.

Figure 2:
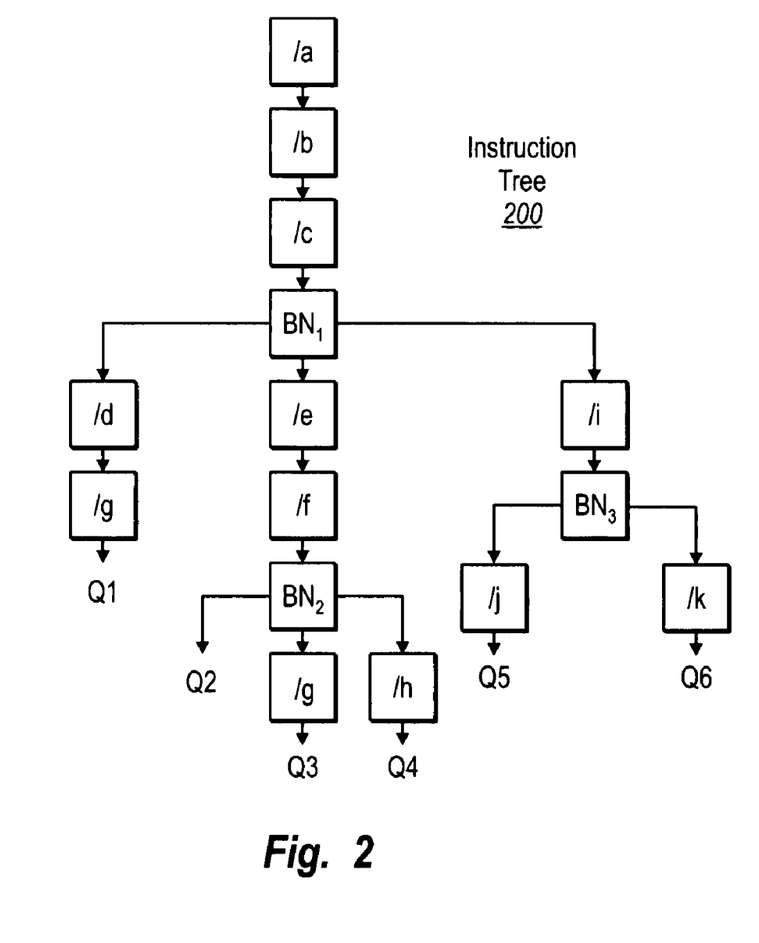
FIG. 2 illustrates an example of an instruction tree for an inverse query filter engine.

To clarify this principle, a specific example is provided with respect to FIG. 2. Note, however, the instruction tree is not limited to any particular type of data structure. In fact, embodiments described herein may be used for optimizing any type of hierarchical data structure used in any type of inverse query engine. As such, any specific type of instruction tree as described herein is used for illustrative purposes only and is not meant to limit or otherwise narrow the scope of the present invention unless explicitly claimed.

FIG. 2 illustrates an instruction tree 200 with a plurality of merged query paths, wherein each path in the instruction tree represents the compiled code of six possible query expressions. Specifically, as one navigates from the root node to the terminating node in each ancestral line of the instruction tree 200, one finds the execution path for each of the six queries Q1 to Q6 with the inclusion of the occasional branching node to help preserve context at the appropriate time. More specifically, the sequential processing of each query may be logically divided into groups of one or more computer-executable instructions.

These groups are represented in FIG. 2 using groups "/a" through "/k" with "/a" representing the root node. For example, query Q1 is processed by sequentially executing instruction groups "/a/b/c/d/g". Query Q2 is processed by sequentially executing instruction groups "/a/b/c/e/f". Query Q3 is processed by sequentially executing instruction groups "/a/b/c/e/f/g". Query Q4 is processed by sequentially executing instruction group "/a/b/c/e/f/h". Query Q5 is processed by sequentially executing instruction group "/a/b/c/i/j". Finally, Query Q6 is processed by sequentially executing instruction group "/a/b/c/i/k". Although there may be execution loops within a given instruction group, execution never proceeds backwards from one instruction group to an already processed instruction group.

A "stem" of the instruction tree is defined as those instructions that lead from a root node of the instruction tree to the first branching node of the instruction tree. For example, the instruction tree 200 has a root node "/a" and a first branching node "$BN_1$". Accordingly, the stem of the instruction tree is represented by the instruction group sequence "/a/b/c". The first branching node will also be referred to herein as a "first-order" branching node or "main" branching node. For example, node "$BN_1$" is the first-order or main branching node of instruction tree 200.

It should be noted that a "branch", "sub-expression", "sub-path" are referred to herein interchangeably to refer to any portion of an overall expression. For example, the stem "/a/b/c" is a sub-path for all of the queries Q1 to Q6, and the branch formed by "/d/g" extending from main branch "$BN_1$" is a portion of the query Q1. Note, however, that the stem "a/b/c" although referred to as a sub-expression may also be considered a branch since it extends from the root node "/a", thereby forming the only branch of the root node.

In one embodiment, the queries are XPath queries. XPath is a functional language for representing queries that are often evaluated against XML documents. During conventional evaluation of inverse query paths (such as XPath statements) against XML documents, there is significant looping in order to fully navigate the XML document. For example, if the XML document has one parent element having at least one child element, at least one of the child elements having at least one second-order child element, and at least one of the second-order child elements having at least one third-order child element, there would be a three layer "for" loop nest conventionally used to navigate the tree.

A loop is an expression that executes a group of one or more sub-expressions repeatedly. Each repetition is termed an "iteration". The number of times a loop iterates over a group of one or more sub-expressions is known as the loop's "iteration count".

Conventional loops run sequentially from a branching node. A loop with an iteration count of "n" evaluates its groups of one or more sub-expressions "n" times, one iteration at a time, with the second iteration beginning from the branching node only when the first completes. This process is repeated for each branch or sub-path extending from the branching node, thus nodesets (i.e., those input nodes with common axis relative to the branching node, e.g., children, descendent, parent(s), sibling, etc.) are iterated over once per branch. Each of these iterations, however, has implicit overhead, such as the stack manipulation required to make function calls.

In accordance with example embodiments, rather than iterating over an input nodeset with a common axis once per branch, the select indexing described herein iterates over the nodeset once in total. This is accomplished by identifying select index nodes that include select branching instruction that operate on inputs with a common axis. A select index or associative array data structure (e.g., a hash table) is then used to generate empty nodesets indexed to each of the select instructions. The input nodeset for the common axis is iterated through by looking up identifiers, e.g., local name, namespace, or type of input for a type test. These identifiers are then used as the keys into the select index table for identifying matching select instruction(s), whereupon the node is added to the empty (or populated, as the case may be) nodeset for the appropriate instruction. The resultant context is then passed to the branches of the select instructions for further processing. Accordingly, embodiments described herein generate the exact same nodesets as typical inverse query engines described above, except the select indexing produces simultaneous construction of all of the output sets by iterating over the input nodeset once in total, rather than once per branch.

Figure 3:
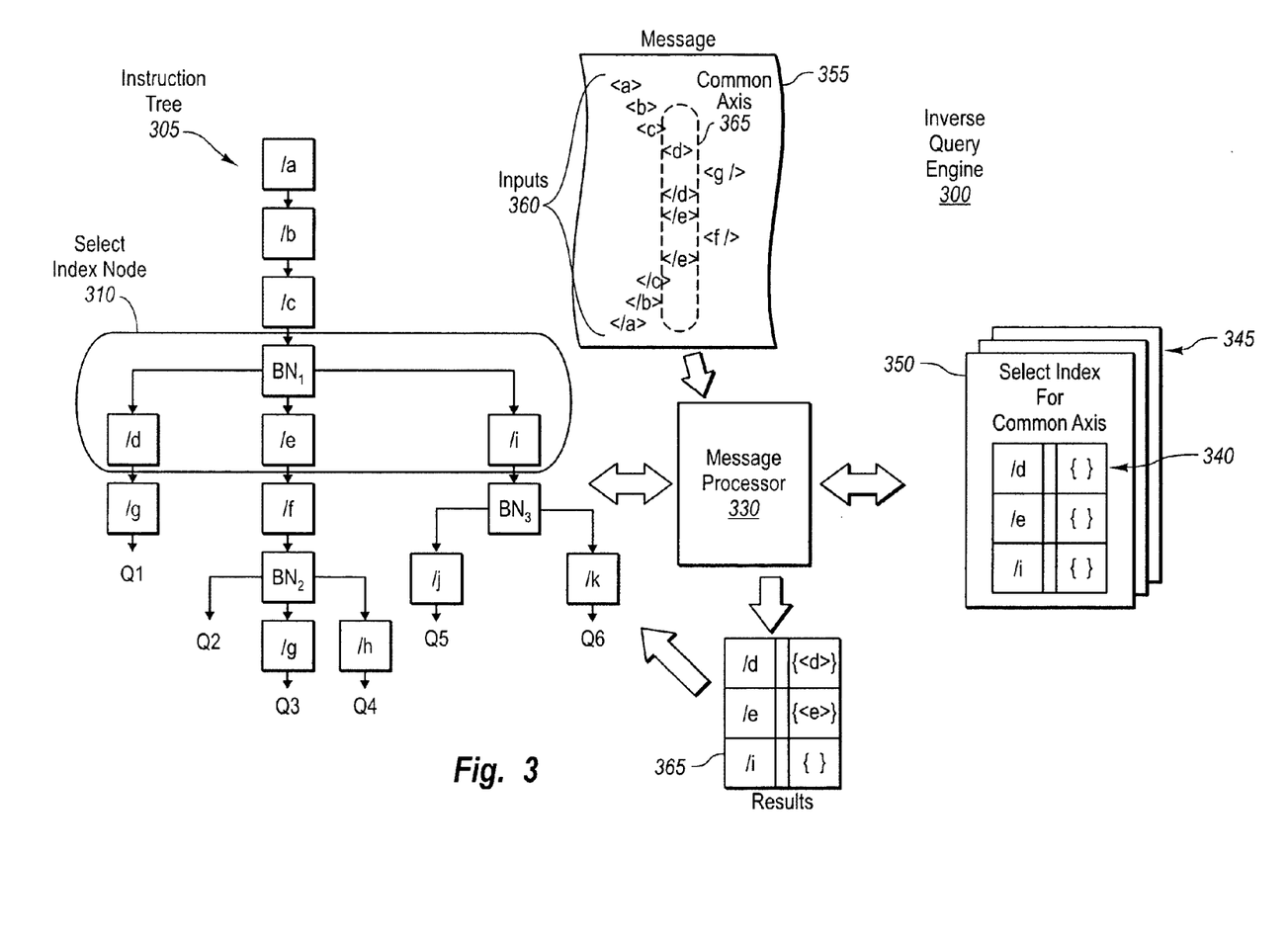
FIG. 3 illustrates an inverse query engine using select indexing for efficiently evaluating message input nodes of a common axis in accordance with example embodiments.

FIG. 3 illustrates an example of how a select indexing may be used to determine those input nodesets that satisfy select instructions for query expressions in accordance with example embodiments. A message 355 with various inputs 360 is received at the inverse query engine 300. The inputs 360 are then iteratively compared against the instruction tree 305 using message processor 330. More specifically, the instructions within the tree 305 are sequentially executed starting at root node "/a" for determining those inputs that match criteria for the query expressions Q1 to Q6, as previously described. When a branching node is reached that is identified as a select indexing branch, the inverse query engine 300 uses the select indexes 345 for determining the outputs of select branches extending from the branching node that will be further evaluated.

For example, when the evaluation of message 355 against instruction tree 305 reaches the main branching node $BN_1$, the message processor 330, or some other module, may first identify the branching node as a select index node 310. Note that the identification of select index node 310 may occur in any one of numerous well know ways; however, in order for a branching node, e.g., $BN_1$ to qualify as a "select index" node 310, it should meet some basic requirements. For example, the select index node 310 acts as a super node that includes instruction nodes for query expressions with common properties. More specifically, as shown in FIG. 3, each instruction node (e.g., "/d", "/e", and "/i") or sub-paths thereof should diverge from a common branching node, in this example, $BN_1$.

In addition, the instruction nodes within the node set should operate on the same input axis within a message. For example, as shown in FIG. 3, the instruction nodes "/d", "/e", and "/i" within instruction tree 305 diverge from branching node $BN_1$, as well as operate on the same input nodeset relative to the branch from where they diverge. In particular, note that the instructions nodes "/d", "/e", and "/i" will operate or be compared against the inputs within the common axis 365, which is the child node relative to the branching node $BN_1$.

Note that these instruction nodes "/d", "/e", and "/i" selectively operate on the input nodes of the common axis by default. More specifically, because a resultant operating axis is not specified in each of these examples, the default of child is assumed. Embodiments described herein, however, are also applicable to other axis relative to the branching node. In fact, as previously noted, all that is needed is that the instruction nodeset within the select index node 310 all be operating on the same or common input axis 365. Accordingly, the axis may be any one of a child, parent, grandparent, decedent, sibling, or any other known axis relative to the node from which they diverge. Accordingly, any specific reference to any specific axis as described herein is used for illustrative purposes only and is not meant to limit or otherwise narrow the scope of the embodiments unless explicitly claimed.

Regardless of the common axis 365 for which the instruction nodes (e.g., "/d", "/e", and "/i") within the select index node 310 operate on, once message processor 330, or other component, identifies the branching node as a select index node 310, the message processor will use a select index for the common axis 350 for generating an index table as described in greater detail below. Note that the select index for the common axis 350 may be chosen from a plurality of select indexes 345 generated for different common axis 365. Further note, that the indexes may be generated on the fly, or predefined at compile time. In fact, embodiments herein contemplate many well known ways of generating the select index tables or associative data structures, as well as allow for many different forms thereof (e.g., hash tables). Accordingly, any specific reference to any way of generating an index table 350 or for any specific type of array is used herein for illustrative purposes only and is not meant to limit or otherwise narrow the scope of embodiments herein unless explicitly claimed.

Regardless of how or what type of select index 350 for common axis 365 is generated, the resultant associative array will generate an empty nodeset 340 for each select instruction node in the select index node 310. For example, as shown by the "{ }" brackets in the select index for the common axis 350, the instruction nodes "/d", "/e", and "/i" have corresponding empty node sets 340 for which they are indexed. The inputs 360 within the message 355 that correspond to the common axis (in this example, shown circled 365 in message 355) may then compared to the select index for the common axis 350.

As can be seen, the common axis 365 in message 355 includes inputs nodes "<d>" and "<e>". Accordingly, the namespaces, local names, qualified names, or types (in the case of type tests) of these inputs or elements may then be compared with the values within the select index for the common axis 350. Note, however, that any other alphanumeric or other equality value may be used for determining matches. In fact, anything that can be used as the key to a random access, associative data structure can be used as the basis for the comparison. Accordingly, any specific value is used for illustrative purposes only unless otherwise explicitly claimed. In addition, note that for efficiency purposes typically the select indexes 345 will be hash tables; however, that need not be the case. In any event, if the select index for the common axis 350 is a hash table, the inputs will be converted to hash values using message processor 330 or some other component for comparison against the select index table.

Regardless of the type of alphanumeric values used in the comparison, message processor 330 iterates through the common axis 365 searching for the appropriate identifiers (e.g., Qnames for nodes "<d>" and "<e>") to compare to the indices (e.g., "/d", "/e", and "/i") within the table 340 and matches the appropriate input nodes 365 with the corresponding index in the select index 350. In this example, note that the select index for the common axis 350 matches the <d> input element from the common axis 365 in the message 355 with instruction node "/d". Similarly, "<e>" input node from the common axis 365 matches with the "/e" instruction node, whereas there is no match in the common axis 365 for "/i" instruction node.

Accordingly, as matches are identified, their corresponding empty node set 340 is populated with the appropriate input node information to produce the output results 365. These results 365 may then be passed using message processor 330 to the branches extending from the instruction nodes for, in this case, "/d", "/e", and "/i" for further processing. Mores specifically, the results will be passed to the children nodes of the select index node 310, in this case "/g", "/f", and "$BN_3$". Note that although in this example only one match was found for each empty nodeset, this need not be the case. Accordingly, the empty nodesets within the instruction tree may be populated with multiple input nodes for passing to the corresponding branches extending from the select index node 310.

Also as previously noted, the above process can be repeated for any other branching node within the instruction tree 305. For example, other select indexes 345 may be used for other axis relative to other branches nodes, e.g., $BN_2$, $BN_3$, etc. Typically, however, the branching nodes should have a large splay in order to reap optimal benefits from embodiments described herein.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagram for FIG. 4—is used to indicate the desired specific use of such terms.

Figure 4:
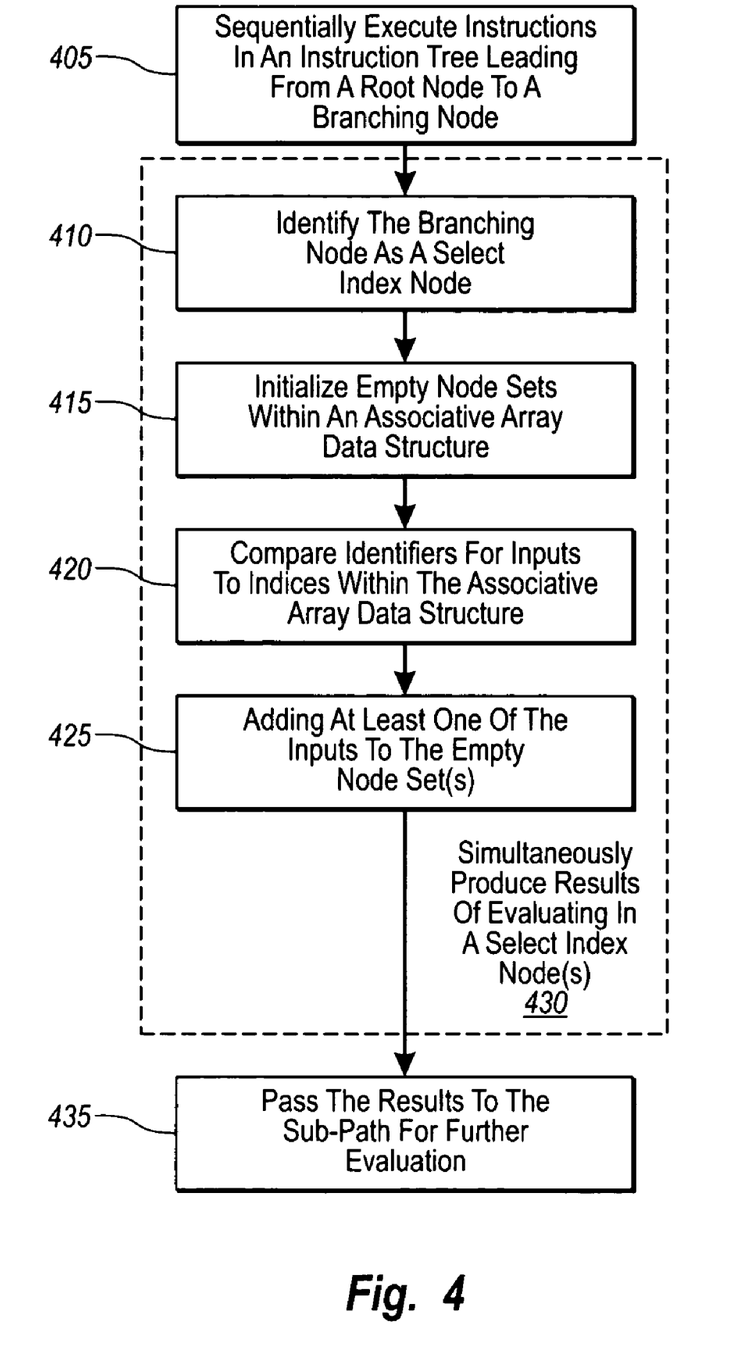
FIG. 4 illustrates a flow diagram for a method of efficiently evaluating select instructions of a query expression in accordance with example embodiments.

As previously mentioned, FIG. 4 illustrates a flow diagram for various exemplary embodiments of the present invention. The following description of FIG. 4 will occasionally refer to corresponding elements from FIGS. 1, 2, and 3. Although reference may be made to a specific element from these Figures, such elements are used for illustrative purposes only and are not meant to limit or otherwise narrow the scope of the described embodiments unless explicitly claimed.

FIG. 4 illustrates a flow diagram for a method 400 of efficiently evaluating select instructions of query expressions that both diverge from a common branching node and search for inputs of a message that share a common axis by simultaneously producing outputs for the select instructions. The inverse query process begins in response to having received an electronic message 110, 355. For example, referring to FIGS. 1 and 3, the inverse query engine 115, 300 receives the electronic message 110, 355 with various inputs 360. The electronic message 110, 355 may be received from another network location and/or may be accessed locally.

Method 400 includes an act of sequentially executing 405 instructions in the instruction tree leading from a root node to a branching node. For example, based on inputs 360 within a received message 355, message processor 330 within inverse query engine 300 (e.g., an XPath query filter engine) can sequentially execute instructions in instruction tree 305 leading from root node "/a" to main branching node $BN_1$. Note that the main branching node includes a plurality of query sub-paths ("/d", "/e", and "/i") for a plurality of query expressions (e.g., Q1 to Q6) leading from the branching node $BN_1$. Further, the message may be an XML document such as a SOAP message that includes headers, and the common axis 355 may represent a series of headers in the XML document.

Upon encountering the branching node, Method 400 includes a step for simultaneously producing 430 results of evaluating select index node(s). More specifically, step for 420 includes an act of identifying 410 the branching node as a select index node. For example, message processor 330, or other component, may identify branching node $BN_1$ as part of a select indexing node 310 in that the query sub-paths extending there from (e.g., "/d", "/e", and "/i") each include a select instruction node that operate on input nodes 360 for the message 355 that share a common axis 355 relative to the processing context for the sequential execution up to the branching node $BN_1$. Note that the common axis 355 may be a child, parent, sibling, descendent, or any other related node relative to the branching node.

Based on the identification of the branching node as a select index node, step for 430 also includes an act of initializing 415 empty nodesets within an associative array data structure. For example, upon identifying the branching node $BN_1$ as corresponding to a select index node 310, message processor 330 may initialize empty nodesets 340 within select index for common axis 350 for each of the select instruction nodes, e.g., "/d", "/e", and "/i". Note, as mentioned previously, that the initialization of the empty node sets 340 may include retrieving the select index for common axis 345 from memory, or may generate such on-the-fly, or by any other well known way.

In any event, step for 430 also includes an act of comparing 420 identifiers for inputs to indices within the associative array data structure. For example, message processor 330 may compare the input nodes "<d>" and "<e>" to the indices "/d", "/e", and "/i" within the select index 350 for determining matches thereof. Based on the comparison, step for 430 includes an act of adding at least one of the inputs to the empty node set(s). For instance, upon identifying the matches for "/d" and "/e", message processor may add the input nodes "<d>" and "<e>" to the empty node sets 340 within the select index 350 for simultaneously producing results 365 of evaluating each of the select instruction nodes, e.g., "<d>" and "<e>".

Finally, method 400 includes an act of passing the results to the sub-paths for further evaluation. For example, the child nodes of the select index node 310 may be passed the results 365 for further evaluation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an inverse query filter engine used in evaluating a plurality of query expressions against a plurality of inputs of a message, a method for efficiently evaluating select instructions of query expressions, wherein the select instructions of query expressions both diverge from a common branching node and operate on inputs nodes of the message that share a common axis, whereby outputs for the select instructions are produced simultaneously for the input node of the message sharing a common axis; the method comprising:

sequentially executing instructions of query expressions in an instruction tree leading from a root node to a branching node based on one or more inputs within a received message, wherein the branching node includes a plurality of query sub-paths extending there from;

identifying the branching node as a select index node in that the plurality of the query sub-paths extending from the branching node each include a select instruction node that operate on a plurality of inputs of a message that share a common axis relative to the processing context for the sequential execution up to the branching node;

based upon identification of the branching node as a select index node, initializing empty node sets within an associative array data structure for each of the select instruction nodes;

comparing identifiers for each of the plurality of inputs to indices within the associative array data structure for determining matches thereof;

based upon the comparison, adding at least one of the inputs of the message to one or more of the empty node sets within the associative data structure, thereby simultaneously producing results of evaluating each of the select instruction nodes for the inputs of the message; and upon completion of the evaluation of the select input nodes, passing the results to the branches extending from each of the plurality of query sub-paths for further evaluation in parallel.

2. The method of claim 1, wherein the message is an XML document.

3. The method of claim 2, wherein the inputs for the XML document include headers, and the common axis represents a series of headers in the XML document.

4. The method of claim 2, wherein the XML document is a SOAP message.

5. The method of claim 4, wherein the inverse query filter engine is an XPath filter engine.

6. The method of claim 2, wherein the identifiers for the input nodes that are compared to the indices within the associative array data structure are one or more of a namespace, local name, or input type.

7. The method of claim 1, wherein the associative array data structure is a hash table.

8. The method of claim 1, wherein the common axis is one of a child, descendent, parent, or sibling relative to the branching node.

9. The method of claim 1, wherein the method is repeated for another branching node within the one or more of the plurality of sub-paths whose empty node set was populated with the at least one node.

10. In an inverse query filter engine used in evaluating a plurality of query expressions against inputs of a message, a computer program product for implementing method for efficiently evaluating select instructions of query expressions that both diverge from a common branching node and search for inputs nodes of a message that share a common axis by simultaneously producing outputs for the select instructions; the computer program product comprising one or more computer readable media having stored thereon computer executable instructions that, when executed by a processor, can cause the inverse query filter engine to perform the following:

sequentially execute instructions in an instruction tree leading from a root node to a branching node based on one or more inputs within a received message, wherein the branching node includes a plurality of query sub-paths extending there from;

identify the branching node as a select index node in that the plurality of the query sub-paths extending from the branching node each include a select instruction node that operate on a plurality of inputs that share a common axis relative to the processing context for the sequential execution up to the branching node;

based upon identification of the branching node, initialize empty node sets within an associative array data structure for each of the select instruction nodes;

compare identifiers for each of the plurality of inputs to indices within the associative array data structure for determining matches thereof;

based upon the comparison, add at least one of the inputs to one or more of the empty node sets within the associative data structure thereby simultaneously producing results of evaluating each of the select instruction nodes; and upon completion of the evaluation of the select input nodes, pass the results to the branches extending from each of the plurality of query sub-paths for further evaluation in parallel.

11. The computer program product of claim 10, wherein the message is an XML document.

12. The computer program product of claim 11, wherein the inputs for the XML document include headers, and the common axis represents a series of headers in the XML document.

13. The computer program product of claim 11, wherein the XML document is a SOAP message.

14. The computer program product of claim 13, wherein the inverse query filter engine is an XPath filter engine.

15. The computer program product of claim 11, wherein the inputs are one or more of a namespace, local name, or type.

16. The computer program product of claim 10, wherein the associative array data structure is a hash table.

17. The computer program product of claim 10, wherein the common axis is a child, sibling, parent, or descendent relative to the branching node.

18. The computer program product of claim 10, is repeated for another branching node within the one or more of the plurality of sub-paths whose empty node set was populated with the at least one node.

19. The method of claim 1 wherein the associative array data structure is predefined prior to executing the tree of query expressions.

20. The method of claim 10, wherein the associative array data structure is predefined prior to executing the tree of query expressions.

* * * * *